United States Patent
Boschma, Jr.

(10) Patent No.: US 6,715,712 B2
(45) Date of Patent: Apr. 6, 2004

(54) AEROSTAT DEPLOYMENT APPARATUS

(75) Inventor: James H. Boschma, Jr., Huntsville, AL (US)

(73) Assignee: Information Systems Laboratories, Inc., San Diego, CA (US)

( * ) Notice: Subject to any disclaimer, the term of this patent is extended or adjusted under 35 U.S.C. 154(b) by 0 days.

(21) Appl. No.: 10/150,142

(22) Filed: May 17, 2002

(65) Prior Publication Data

US 2002/0171006 A1 Nov. 21, 2002

Related U.S. Application Data

(60) Provisional application No. 60/291,658, filed on May 18, 2001, and provisional application No. 60/336,378, filed on Dec. 6, 2001.

(51) Int. Cl.[7] ............................................. B64B 1/06
(52) U.S. Cl. ............................ 244/30; 244/98; 244/115
(58) Field of Search ........................... 244/30, 98, 125, 244/128, 115, 33, 146; 446/225

(56) References Cited

U.S. PATENT DOCUMENTS

| | | | | |
|---|---|---|---|---|
| 1,370,043 A | * | 3/1921 | Preston | 244/30 |
| 3,387,805 A | * | 6/1968 | Barnett et al. | 244/138 R |
| 3,412,963 A | * | 11/1968 | Struble, Jr. | 244/146 |
| 3,905,567 A | | 9/1975 | Menke et al. | |
| 4,402,479 A | | 9/1983 | Phipps, III et al. | |
| 5,388,786 A | * | 2/1995 | Hirose | 244/138 R |
| 5,816,537 A | * | 10/1998 | Pascoe et al. | 244/153 R |
| 6,317,080 B1 | * | 11/2001 | Baxter, Jr. | 342/357.09 |

FOREIGN PATENT DOCUMENTS

| | | | | |
|---|---|---|---|---|
| FR | 2 612 485 | | 9/1988 | |
| FR | 2612485 A1 | * | 9/1988 | B64B/1/02 |

* cited by examiner

*Primary Examiner*—Peter M. Poon
*Assistant Examiner*—Timothy D. Collins
(74) *Attorney, Agent, or Firm*—Nydegger & Associates

(57) ABSTRACT

An apparatus for inflating and deploying an aerostat having a nose section and a tail section includes a cylindrical container for housing the deflated portion of the aerostat. The cylindrical container is formed with an open end and defines a longitudinal axis. A feed hose extends from a gas source, through the container to a hose end that projects axially from the open end of the container. The deflated aerostat is initially folded to juxtapose the nose and tail of the aerostat. Next, the nose of the aerostat is attached to the feed hose end and the remaining portion of the aerostat is folded and inserted into the container. As the tail section is inflated outside of the container, aerostat cloth is drawn from the container. A mechanism is provided to control the release of cloth from the container and maintain pressure in the inflating aerostat within a predetermined range.

10 Claims, 5 Drawing Sheets

AEROSTAT DEPLOYMENT APPARATUS

This application claims the benefit of U.S. Provisional Application Ser. No. 60/291,658 filed May 18, 2001 and U.S. Provisional Application Ser. No. 60/336,378 filed Dec. 6, 2001.

FIELD OF THE INVENTION

The present invention pertains generally to aerostats and aerostat deployment apparatus. More particularly, the present invention pertains to a compact deployment apparatus that rapidly inflates and deploys an aerostat. The present invention is particularly, but not exclusively, useful as a deployment apparatus that incrementally inflates an aerostat for rapid deployment in windy and otherwise adverse weather conditions.

BACKGROUND OF THE INVENTION

Tethered lighter-than-air vehicles provide an ideal platform to elevate various payloads. Typical payloads include sensors, communications antennas and relay equipment, cameras and other devices that can take advantage of an elevated position. Typical applications of such devices include telecommunications, electronic warfare, imagery collection, scientific study, aerial advertising, surveillance and television operations. Many of these applications require an elevated platform to be established quickly, with little notice, and without regard to weather conditions.

Heretofore, a typical aerostat inflation and deployment operation has involved a large ground team that can layout and hold the rather large, deflated aerostat, while a lighter-than-air gas is being introduced to inflate the aerostat. These procedures inevitably resulted in large amounts of loose aerostat cloth during inflation that can be damaged in even mild wind conditions. Specifically, the wind can cause the loose aerostat cloth to flap and/or strain, resulting in damage to the aerostat. Additionally, when loose aerostat cloth is present, the wind can cause the location of the Helium inflation "bubble" to shift. This shifting of the Helium bubble can also damage the aerostat cloth. In short, these procedures have generally required a large ground team and have been restricted to optimum weather conditions.

In light of the above, it is an object of the present invention to provide apparatuses and methods suitable for rapidly deploying an aerostat in windy conditions. It is another object of the present invention to provide an aerostat deployment apparatus that allows for the incremental inflation and rapid deployment of an aerostat without the requirement of a large ground crew at the deployment site. It is yet another object of the present invention to provide a compact aerostat deployment apparatus that can be easily transported to the deployment site using a light-duty truck. Yet another object of the present invention is to provide an aerostat deployment apparatus and a method for its use that are easy to use, relatively simple to implement, and comparatively cost effective.

SUMMARY OF THE PREFERRED EMBODIMENTS

The present invention is directed to an apparatus for inflating and deploying an aerostat. For the present invention, the aerostat is preferably an elongated cloth balloon having a nose section at one end and a tail section at the other. The inflation and deployment apparatus includes a substantially cylindrical container for housing the deflated aerostat. The cylindrical container is formed with an open end and defines a longitudinal axis. A feed hose is provided to inflate the aerostat. Specifically, the feed hose passes into the container and extends along the longitudinal axis of the container to a hose end that projects slightly from the open end of the container. The other end of the feed hose is connected to a gas source that is located outside the container.

To position the deflated aerostat on the apparatus, the deflated aerostat is first folded to juxtapose the nose of the aerostat with the tail of the aerostat. Next, the nose of the aerostat is attached to the end of the feed hose that extends from the container opening. A feed port is provided in the nose section of the aerostat to allow lighter-than-air inflation gas to pass from the feed hose and into the aerostat. With the nose section attached to the feed hose and the tail section positioned immediately above the nose section, the remaining portion of the aerostat is folded and inserted into the container. More specifically, the remaining portion of the aerostat is preferably folded into pleats (i.e. similar to the bellows of an accordion) and inserted into the container.

With the above described cooperation of structure, the first portion of the aerostat to inflate when gas passes through the feed hose will be the tail section. As the tail section inflates outside of the container, additional cloth is drawn from the container due to the expanding tail section. Also, wind loading on the exposed portion of the aerostat also tends to draw additional aerostat cloth from the container. Inflation in this manner can be continued until the aerostat is completely inflated, at which point the entire aerostat will be located outside the container. With the aerostat completely inflated, the aerostat can be removed from the feed hose for tethered flight.

Importantly for the present invention, the apparatus includes a restraint mechanism to control the rate of release of aerostat cloth from the container during inflation. Functionally, the restraint mechanism controls the release rate of aerostat cloth to maintain the pressure in the inflated portion of the aerostat within a predetermined range. By maintaining this pressure within a predetermined range, the inflated portion of the aerostat remains taut, preventing damage to the aerostat due to wind loading. As indicated above, loose aerostat cloth can be damaged from flapping or strain caused by wind loads.

In one embodiment of the present invention, the restraint mechanism includes a bowl-shaped member that is positioned at the open end of the container and is centered on the longitudinal axis. A hole formed in the center of the bowl-shaped member allows the member to be installed over the end of the feed hose (i.e. before the deflated aerostat is attached to the feed hose). Springs are provided to bias the bowl-shaped member relative to the feed hose. More specifically, the member is biased away from the end of the feed hose and toward the container. With the bowl-shaped member installed, the aerostat is folded (as described above) and the nose section of the aerostat is attached to the end of the feed hose. The remainder of the aerostat is draped around the edge of the bowl-shaped member and the pleated body portion of the aerostat is inserted into the container.

As indicated above, inflation of the exposed portion of the aerostat generates forces that tend to draw additional aerostat cloth from the container. Additionally, wind loads on the exposed portion of the aerostat will generate forces that tend to draw additional aerostat cloth from the container. To exit the container, the aerostat cloth must pass around the edge of the bowl-shaped member. The bowl-shaped member, in turn, is biased towards the container by the springs mentioned above. This bias establishes forces on the aerostat cloth that tend to oppose the drawing forces that are generated by the wind and by inflation of the aerostat. For the present invention, the magnitude of these opposing forces can be controlled to maintain the pressure in the inflated portion of the aerostat within a predetermined range. More specifically, the opposing forces can be controlled by the proper design of the springs.

In another embodiment of the present invention, the restraint mechanism includes a friction sheet. For this embodiment of the present invention, the friction sheet is formed with a substantially circular opening that extends through the friction sheet and is located at the center of the friction sheet. Preferably, the opening of the friction sheet is lined by an elastomeric material, such as rubber. The friction sheet is positioned at the open end of the container with its circular opening substantially centered on the longitudinal axis and on the feed hose that extends through the circular opening. With the friction sheet positioned in this manner and attached to the container, the aerostat is folded (as described above) and the nose section of the aerostat is attached to the end of the feed hose. The remainder of the aerostat is then inserted through the circular opening and into the container.

As described above, forces are established during inflation that act to draw additional aerostat cloth from the container. To exit the container, the aerostat cloth must pass through the circular opening in the friction sheet. More specifically, the aerostat cloth must contact and pass over the rubber lining to exit the container. The frictional forces generated while the aerostat cloth contacts and passes over the rubber lining oppose the drawing forces created by wind loads and inflation of the aerostat. By properly sizing the friction sheet, the magnitude of the opposing forces can be controlled to maintain the pressure in the inflated portion of the aerostat within a predetermined range.

In this embodiment, an optional restraining line can be used in conjunction with the friction sheet to control the rate of release of aerostat cloth from the container during inflation. The restraining line extends into the aerostat and terminates at an end that is attached to the tail section of the aerostat. The other end of the restraining line is wrapped around an auto-control braking pulley that is preferably mounted on the feed hose. An optional pressure sensor mounted inside the tail section of the aerostat cooperates with the braking pulley to feed-out a restraining line when the pressure inside the aerostat rises above a predetermined amount. On the other hand, the pressure sensor cooperates with the braking pulley to prevent restraining line feed-out when the pressure inside the aerostat falls below a predetermined amount. Thus, the rate of aerostat cloth release can be controlled by the restraining line to maintain the pressure in the inflated portion of the aerostat within a predetermined range.

In the preferred embodiment of the present invention, the container is mounted on a two-axis gimbal. The attachment points of the gimbal are positioned on the container to allow the container to independently rotate about the longitudinal axis of the container, and about a transverse axis that is normal to the longitudinal axis. Preferably, the transverse axis passes through the container near the container's open end. For the present invention, the feed hose and restraint mechanism (i.e. friction sheet or bowl-shaped member) also rotate with the container on the two-axis gimbal. A weathervane is preferably attached to the canister. The two-axis gimbal and weathervane cooperate to orient the tail section of the aerostat downwind during inflation. This insures that the rigging is properly oriented on the bottom of the aerostat. In another embodiment, the two-axis deployment gimbal is oriented manually in a manner to insure that the tail section of the aerostat is deployed downwind with the rigging on the bottom.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
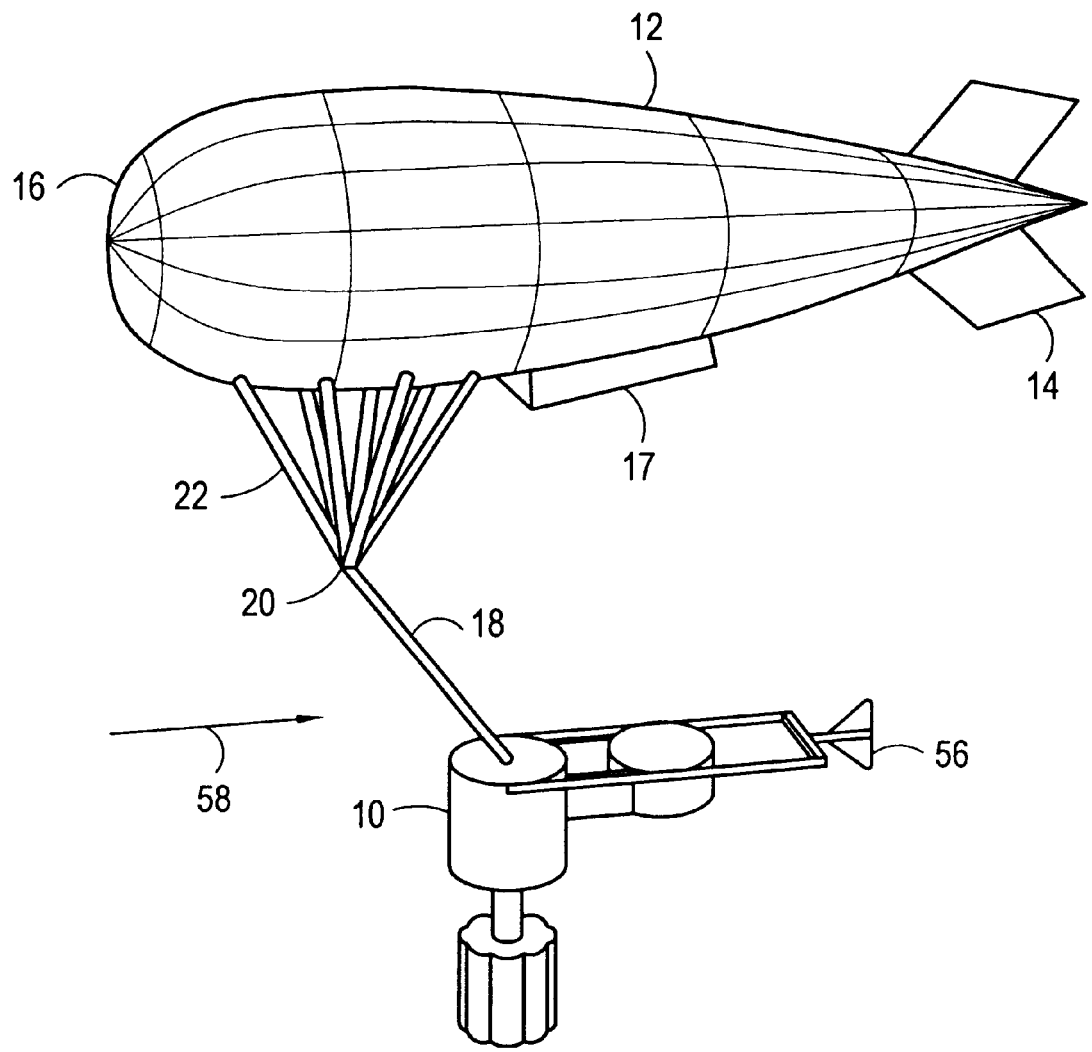
FIG. 1 is a perspective view of an inflation and deployment apparatus in accordance with the present invention shown after the deployment of a tethered aerostat.

Referring to FIG. 1, an apparatus 10 for inflating and deploying an aerostat 12 in accordance with the present invention is shown. FIG. 1 further shows that the inflatable aerostat 12 is preferably elongated having a tail section 14 at one end, a nose section 16 at the other end and generally includes a payload 17. For the present invention, the payload 17 can include sensors, communications antennas and relay equipment, cameras and other devices that can take advantage of an elevated position. Preferably, as shown, the tail section 14 includes inflatable horizontal and vertical stabilizers, although it is to be appreciated that properly arranged rigid stabilizers may be substituted in place of the inflatable stabilizers for some applications. Preferably, the aerostat 12 is constructed of a cloth fabric that is relatively strong, resistant to ultra-violet radiation damage, and relatively impermeable to prevent leakage of the inflation gas. For the present invention, any lighter-than-air gas known in the pertinent art such as Helium (He) can be used in the apparatus 10 to inflate the aerostat 12.

As further shown in FIG. 1, the aerostat 12 is preferably tethered to the apparatus 10 when fully deployed. More specifically, as shown, a tether 18 extends from the apparatus 10 to a rigging confluence point 20. A flying sheave (not shown) mounted on a shock absorbing idler arm (also not shown) can be used to attach the tether 18 to the apparatus 10. As shown in FIG. 1, rigging 22 extends from the rigging confluence point 20 to nose mounted mooring points, and thus attaches the aerostat 12 to the tether 18. It is to be further appreciated that a winch and winch controller (not shown) can be mounted on the apparatus 10 to selectively feed-out or draw-in the tether 18 to control the altitude of the deployed aerostat 12.

Figure 2:
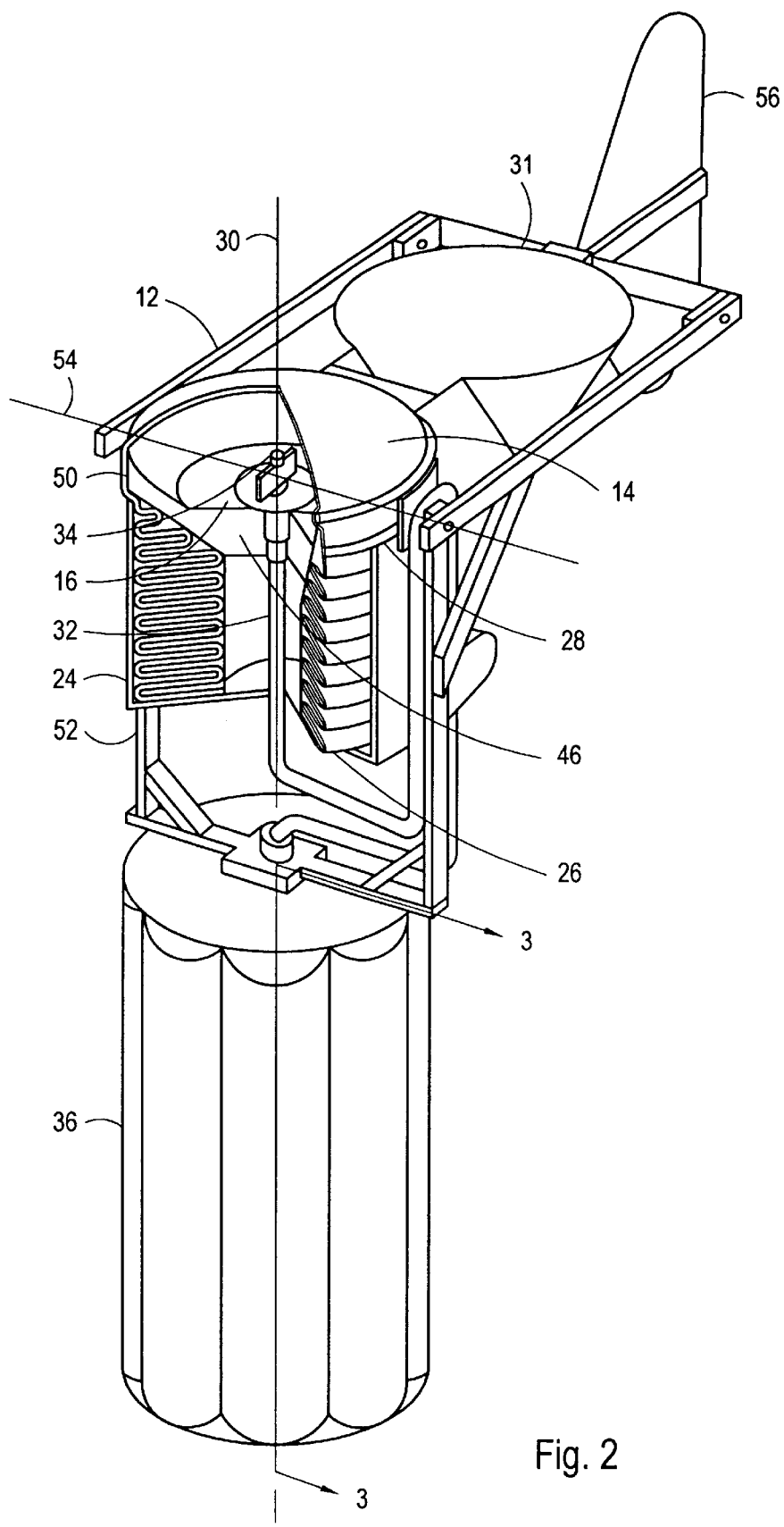
FIG. 2 is a perspective view of an inflation and deployment apparatus in accordance with the present invention with portions removed for clarity.

Referring now to FIG. 2, it can be seen that the apparatus 10 includes a substantially cylindrical container 24 for housing a deflated portion 26 of aerostat 12 during inflation. It is further shown that the cylindrical container 24 is formed with an open end 28 and defines a longitudinal axis 30. An optional container lid 31 can be hingedly attached to the container 24 to protect the container 24 contents during transport and storage of the apparatus 10. To inflate the aerostat 12, a feed hose 32 is provided. As shown, the feed hose 32 passes into the container 24 and extends substantially along the longitudinal axis 30 of the container 24 to a hose end 34 that projects slightly from the open end 28 of the container 24. FIG. 2 further shows that the other end of the feed hose 32 extends into a base 36.

Figure 3:
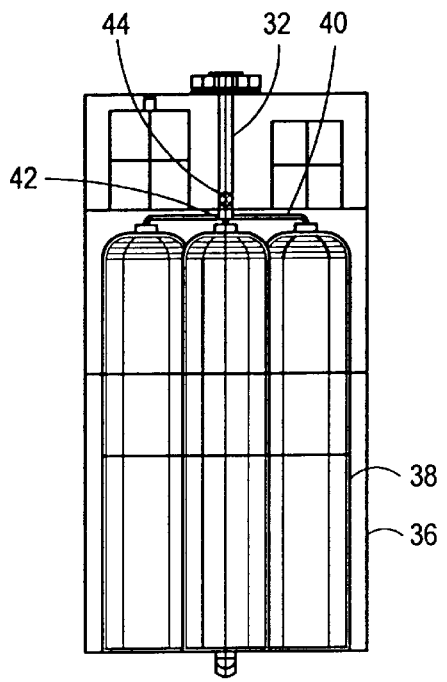
FIG. 3 is a sectional view of the base of the apparatus as seen along line 3—3 in FIG. 2.

With cross reference now to FIGS. 2 and 3, it can be seen that the base 36 houses one or more inflation gas cylinders 38 to deliver inflation gas to the feed hose 32. In the preferred embodiment of the present invention, the inflation gas cylinders 38 contain pressurized Helium (He). From the inflation gas cylinders 38, high pressure lines 40 are provided to transport the pressurized Helium to a manifold 42. As shown, the manifold 42 delivers inflation gas to the feed hose 32. Valve 44 is further provided on feed hose 32 to selectively control the flow of inflation gas through the feed hose 32.

As best seen in FIG. 2, a deflated aerostat 12 is initially positioned on the apparatus 10. More specifically, as shown in FIG. 2, the deflated aerostat 12 is first folded to juxtapose the nose section 16 of the aerostat 12 with the tail section 14 of the aerostat 12. Next, the nose section 16 of the aerostat 12 is attached to the hose end 34 of the feed hose 32. A feed port is provided in the nose section 16 to allow inflation gas to pass from feed hose 32 and into the aerostat 12. With the nose section 16 attached to the feed hose 32 and the tail section 14 positioned immediately above the nose section 16, the remaining portion of the aerostat 12 is folded and inserted into the container 24. As shown, the remaining portion of the aerostat 12 is preferably folded into a plurality of pleats (similar to the bellows of an accordion) and inserted into the container 24.

With continued reference to FIG. 2, it is to be appreciated that the first portion of the aerostat 12 to inflate when inflation gas passes through the feed hose 32 will be the tail section 14. It is to be further appreciated that as the tail section 14 inflates outside of the container 24, additional cloth is drawn from the container 24 due to the expanding tail section 14. Further, wind loading on the exposed portion of the aerostat 12 also tends to draw additional aerostat cloth from the container 24. Inflation can be continued until the aerostat 12 is completely inflated, at which point the entire aerostat 12 will be located outside of the container 24. With the aerostat 12 completely inflated, the aerostat 12 can be removed from the feed hose 32, the feed port on the aerostat 12 sealed, and the tether 18 (shown in FIG. 1) fed out to allow for elevated flight.

Figure 4:
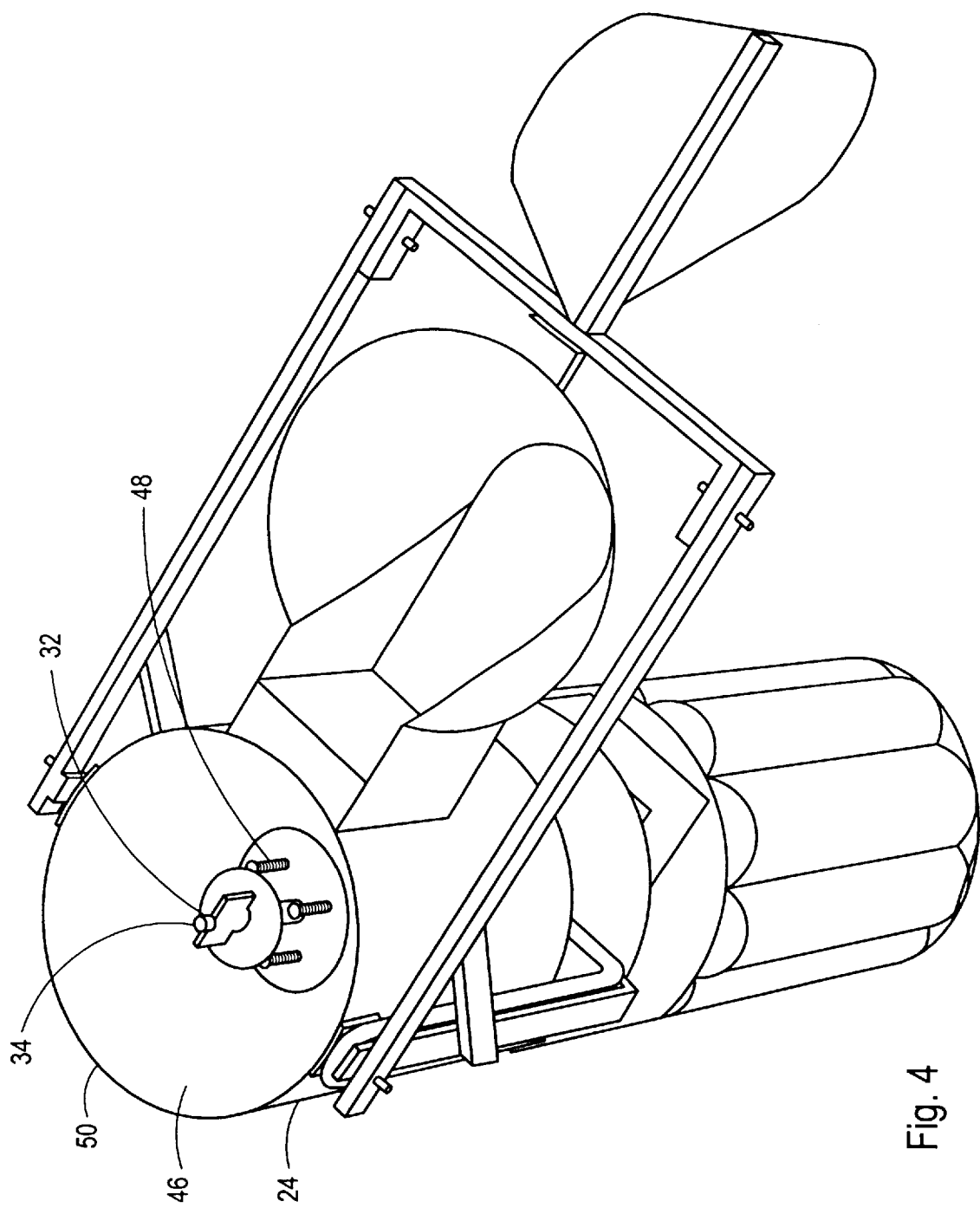
FIG. 4 is a perspective view of the inflation and deployment apparatus shown in FIG. 1, shown here prior to engagement with a deflated aerostat.

With cross reference now to FIGS. 2 and 4, it can be seen that the apparatus 10 includes a bowl-shaped member 46 to control the rate of release of aerostat cloth from the container 24 during inflation. By controlling the rate of aerostat cloth release, the pressure in the inflated portion of the aerostat 12 can be maintained within a predetermined range. With the pressure controlled within a predetermined range, the inflated portion of the aerostat 12 can be maintained in a taut condition, preventing damage to the aerostat 12 due to wind loading. As indicated above, loose aerostat cloth can be damaged from flapping or strain caused by wind loads.

Continuing with cross reference to FIGS. 2 and 4, the bowl-shaped member 46 is positioned at the open end 28 of the container 24 and substantially centered on the longitudinal axis 30. As further shown, a hole is formed in the center of the bowl-shaped member 46 to allow the bowl-shaped member 46 to be installed over the hose end 34 of the feed hose 32. When installed, the bowl-shaped member 46 is movable along the longitudinal axis 30 and relative to the feed hose 32. It is to be appreciated that the bowl-shaped member 46 is installed on the feed hose 32 before the deflated aerostat 12 is positioned on the apparatus 10 and attached to the feed hose 32. As best seen in FIG. 4, the apparatus 10 includes one or more springs 48 to bias the bowl-shaped member 46 away from the end 34 of the feed hose 32 and toward the container 24. With the bowl-shaped member 46 installed, the aerostat 12 is folded (as described above) and the nose section 16 of the aerostat 12 is attached to the end 34 of the feed hose 32, as shown in FIG. 2. As further shown in FIG. 2, the remainder of the aerostat 12 is draped around the edge 50 (edge 50 shown in FIG. 4) of the bowl-shaped member 46 and inserted into the container 24.

With continued cross-reference to FIGS. 2 and 4, it is to be appreciated that during inflation, forces are established by the inflating aerostat 12 that tend to draw additional aerostat cloth from the container 24 (these forces are further aggravated by wind loading on the exposed portion of aerostat 12). As best seen in FIG. 2, the aerostat cloth must pass around the edge 50 of the bowl-shaped member 46 to exit the container 24. The bowl-shaped member 46, in turn, is biased towards the container 24, establishing forces on the aerostat cloth that tend to oppose the drawing forces generated by the wind and inflating aerostat 12. For the present invention, the magnitude of these opposing forces can be controlled by the proper design of the springs 50 to maintain the pressure in the inflated portion of the aerostat 12 within a predetermined range.

Referring back to FIG. 2, it can be seen that a two-axis gimbal is established for the container 24. Structurally, the two-axis gimbal is established by U-shaped bracket 52. As shown, U-shaped bracket 52 is pivotally mounted on base 36, thus allowing the U-shaped bracket 52, container 24, bowl-shaped member 46 and aerostat 12 to rotate about the longitudinal axis 30 of the container 24. It is further shown in FIG. 2 that the container 24 is pivotally attached to the U-shaped bracket 52, allowing the container 24, bowl-shaped member 46 and aerostat 12 to rotate about a transverse axis 54 that extends through the container 24 proximate to the open end 28 of the container 24. With this cooperation of structure, the container 24 is free to independently rotate about both the longitudinal axis 30 and the transverse axis 54.

With cross reference now to FIGS. 1 and 2, it can be seen that a weathervane 56 is preferably attached to the U-shaped bracket 52. With this combination of structure, the two-axis gimbal and weathervane 56 cooperate to orient the tail section 14 of the aerostat 12 downwind (wind direction shown by arrow 58 in FIG. 1) during inflation and deployment of the aerostat 12.

Figure 5:
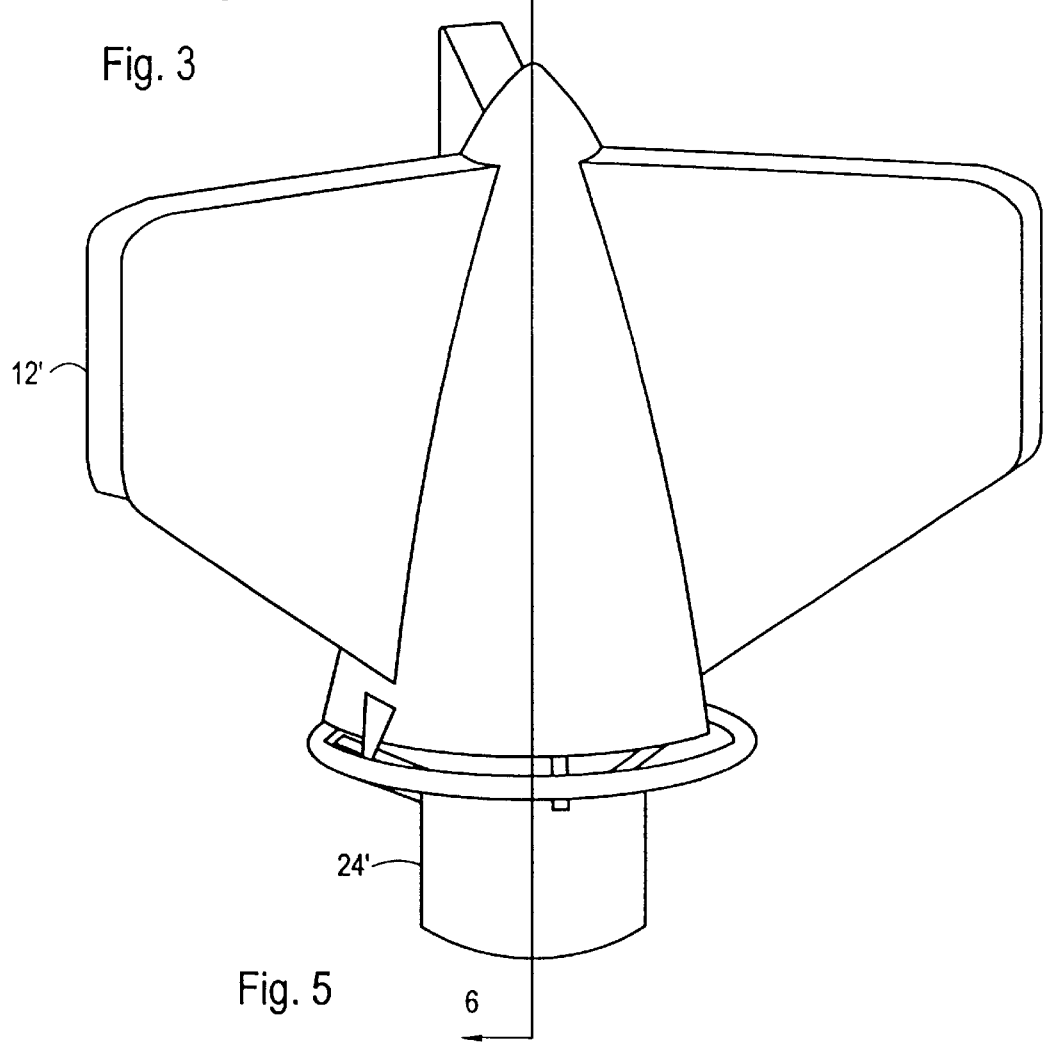
FIG. 5 is a perspective view of an alternate embodiment in accordance with the present invention in which a friction sheet is used to control the rate of release of aerostat cloth from the container during inflation.
Figure 6:
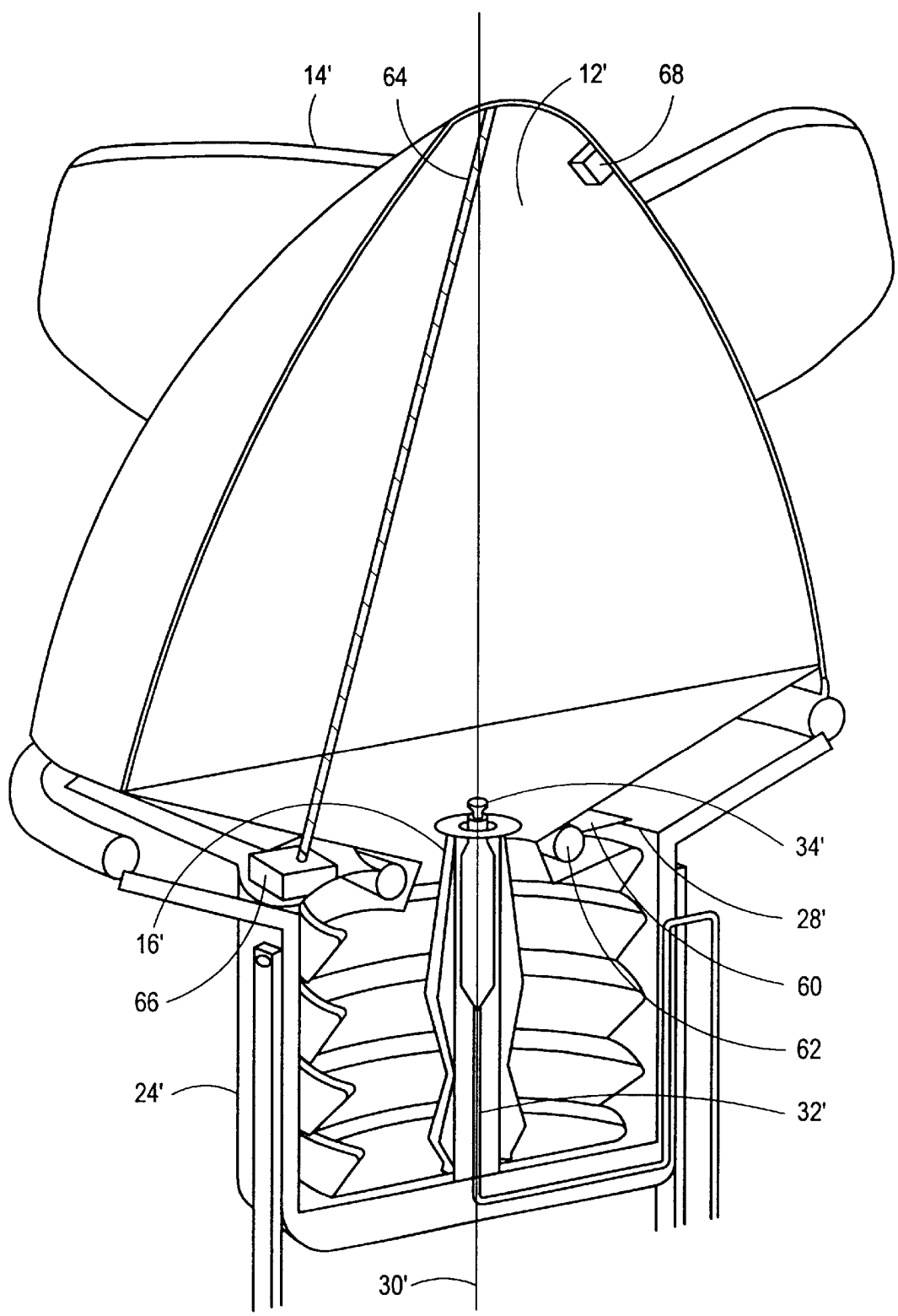
FIG. 6 is a sectional view of the embodiment shown in FIG. 5 as seen along line 6—6 in FIG. 5.

FIGS. 5 and 6 show an alternate embodiment in accordance with the present invention. For clarity, the prime (') has been used to denote elements in FIGS. 5 and 6 that are similar or identical in nature to like-numbered elements in the embodiment shown in FIGS. 1–4. As best seen in FIG. 6, a friction sheet 60 is positioned at the open end 28' of the container 24'. As further shown, the friction sheet 60 is formed with a circular opening that extends through the friction sheet 60 and is located at the center of the friction sheet 60. Preferably, as shown, the friction sheet 60 includes a lining 62, made of an elastomeric material such as rubber, that surrounds the opening of the friction sheet 60. At the open end 28' of the container 24', the friction sheet 60 is positioned with the circular opening centered on the longitudinal axis 30' and the feed hose 32' extending through the circular opening. With the friction sheet 60 positioned in this manner and attached to the container 24', the aerostat 12' is folded (as described above) and the nose section 16' of the aerostat 12' is attached to the end 34' of the feed hose 32'. The remainder of the aerostat 12' is then inserted through the circular opening and into the container 24'.

As described above, it is to be appreciated that forces are established during inflation that act to draw additional aerostat cloth from the container 24'. From FIG. 6 it can be seen that to exit the container 24', the aerostat cloth must pass through the circular opening in the friction sheet 60. More specifically, the aerostat cloth must contact and pass over the rubber lining 62 to exit the container 24'. The frictional forces generated while the aerostat cloth contacts and passes over the rubber lining 62 tend to oppose the drawing forces created by wind loads and the inflating aerostat 12. By properly sizing the friction sheet 60, the magnitude of the opposing forces can be controlled to maintain the pressure in the inflated portion of the aerostat 12' within a predetermined range.

Referring still to FIG. 6, it can be seen that in this embodiment, an optional restraining line 64 can be used in conjunction with the friction sheet 60 to control the rate of release of aerostat cloth from the container 24' during inflation. As shown, one end of the restraining line 64 is attached to the tail section 14' on the inside of the aerostat 12'. The other end of the restraining line 64 is wrapped around an auto-control braking pulley 66. A pressure sensor 68 mounted inside the tail section 14' of the aerostat 12' cooperates with the braking pulley 66 to feed-out restraining line 64 when the pressure inside the aerostat 12' rises above a predetermined amount. On the other hand, the pressure sensor 68 cooperates with the braking pulley 66 to prevent feed-out of restraining line 64 when the pressure inside the aerostat 12' falls below a predetermined amount. In this manner, the restraining line 64 controls the rate of aerostat cloth released to maintain the pressure in the inflated portion of the aerostat 12' within a predetermined range.

While the Aerostat Deployment Apparatus as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An aerostat deployment apparatus comprising:
   a container formed with an open end;
   an aerostat having a first portion disposed within said container and a second portion disposed outside said container;
   a means for inflating said second portion of said aerostat with lighter-than-air gas and drawing said first portion of said aerostat from said container for subsequent inflation outside said container;
   a means for controlling an exit rate of said first portion of said aerostat from said container to maintain a pressure in said second portion of said aerostat within a predetermined pressure range to maintain said second portion of said aerostat taut during inflation; and
   wherein said controlling means comprises:
   a bowl-shaped member positioned at said open end of said container; and
   a means for biasing said bowl-shaped member along a path directed into said container to contact said first portion of said aerostat with said member and limit said exit rate of said first portion from said container.

2. An apparatus as recited in claim 1 wherein said container is substantially cylindrically shaped and defines a longitudinal axis, said inflating means comprises a feed hose, at least a portion of said feed hose extending substantially along said longitudinal axis and terminating proximate said open end of said container and said biasing means comprising at least one spring, each said spring having a first end attached to said member and a second end attached to said feed hose to bias said member relative to said feed hose and along said path directed into said container.

3. A method for inflating and deploying an aerostat, said method comprising the steps of:
   providing a container formed with an open end;
   positioning a first portion of said aerostat within said container;
   inflating a second portion of said aerostat with lighter-than-air gas outside said container to draw said first portion of said aerostat from said container for subsequent inflation outside said container;
   controlling an exit rate of said first portion of said aerostat from said container to maintain a pressure in said second portion of said aerostat within a predetermined pressure range to maintain said second portion of said aerostat taut during inflation; and
   wherein said aerostat is formed with a nose and an opposed tail, said container is substantially cylindrically shaped and defines a longitudinal axis, a rigid member is attached to said container to establish an attachment point substantially alone said longitudinal axis and proximate to said open end of said container, and said positioning step includes the steps of:
   folding said aerostat to juxtapose said nose and said tail; and thereafter
   removably affixing said nose to said rigid member at said attachment point.

4. A method as recited in claim 3 wherein said positioning step includes the step of folding a portion of said aerostat into a plurality of pleats and inserting said pleats into said container.

5. An apparatus for inflating and deploying a cloth aerostat, said apparatus comprising:
   a means for holding aerostat cloth in a substantially deflated configuration;
   a means for incrementally releasing deflated aerostat cloth from said holding means;
   a means for pressurizing said released aerostat cloth with a lighter-than-air gas;
   a means for controlling said incremental release of said aerostat cloth to maintain a pressure in said released cloth within a predetermined pressure range to maintain said released aerostat cloth taut during inflation of said aerostat; and
   wherein said holding means comprises a container having an open end and said controlling means comprises:
   a bowl-shaped member positioned at said open end of said container; and
   a means for biasing said bowl-shaped member along a path directed into said container to contact said first portion of said aerostat with said member and restrain said first portion of said aerostat from exiting said container.

6. An aerostat deployment apparatus comprising:

a container formed with an open end;

an aerostat having a first portion disposed within said container and a second portion disposed outside said container;

a means for inflating said second portion of said aerostat with lighter-than-air gas and drawing said first portion of said aerostat from said container for subsequent inflation outside said container;

a means for controlling an exit rate of said first portion of said aerostat from said container to maintain a pressure in said second portion of said aerostat within a predetermined pressure range to maintain said second portion of said aerostat taut during inflation; and wherein said controlling means comprises:

a braking pulley;

a restraining line having a first end attached to said aerostat and a second end removably attached to said braking pulley;

a pressure sensor positioned in said inflating aerostat portion; and a means responsive to said pressure sensor for causing said braking pulley to feed-out a portion of said restraining line when the pressure in said second portion of said aerostat exceeds a predetermined amount.

7. An aerostat deployment apparatus comprising:

a container formed with an open end;

an aerostat having a first portion disposed within said container and a second portion disposed outside said container;

a means for inflating said second portion of said aerostat with lighter-than-air gas and drawing said first portion of said aerostat from said container for subsequent inflation outside said container;

a means for controlling an exit rate of said first portion of said aerostat from said container to maintain a pressure in said second portion of said aerostat within a predetermined pressure range to maintain said second portion of said aerostat taut during inflation;

a base; and a means for attaching said container to said base to allow said container to independently rotate about a plurality of axes relative to said base.

8. An apparatus as recited in claim 7 wherein said container is substantially cylindrically shaped and defines a longitudinal axis, said container defines a transverse axis passing through said container and said longitudinal axis proximate said open end of said container, said attaching means is configured to allow said container to independently rotate relative to said base about said longitudinal axis and said traverse axis, and said base comprises a lighter-than-air gas reservoir for inflating said aerostat.

9. An apparatus as recited in claim 7 further comprising a weathervane mounted on said container to rotate therewith relative to said base, said weathervane for orienting said aerostat at a predetermined orientation relative to a wind direction during inflation.

10. An apparatus for inflating and deploying a cloth aerostat, said apparatus comprising:

a means for holding aerostat cloth in a substantially deflated configuration;

a means for incrementally releasing deflated aerostat cloth from said holding means;

a means for pressurizing said released aerostat cloth with a lighter-than-air gas;

a means for controlling said incremental release of said aerostat cloth to maintain a pressure in said released cloth within a predetermined pressure range to maintain said released aerostat cloth taut during inflation of said aerostat; and wherein said holding means comprises a container and wherein said apparatus further comprises:

a base; and a means for attaching said container to said base to allow said container to independently rotate about a plurality of axes relative to said base.

* * * * *